No. 821,545. PATENTED MAY 22, 1906.
J. SIMMS.
PUNCH BOWL.
APPLICATION FILED JUNE 22, 1905.

UNITED STATES PATENT OFFICE.

JOSEPH SIMMS, OF DETROIT, MICHIGAN.

PUNCH-BOWL.

No. 821,545. Specification of Letters Patent. Patented May 22, 1906.

Application filed June 22, 1905. Serial No. 266,502.

*To all whom it may concern:*

Be it known that I, JOSEPH SIMMS, a citizen of the United States, residing at Detroit, in the county of Wayne and State of Michigan, have invented certain new and useful Improvements in Punch-Bowls; and I do hereby declare the following to be a full, clear, and exact description of the invention, such as will enable others skilled in the art to which it appertains to make and use the same.

My invention relates to improvements in dispensing-bowls for beverages, more generally designated as "punch-bowls," and has for its object to provide a suitable tray in combination with the bowl proper for supporting the tumblers or cups to be used therewith and adapted to be supported by and forming a part of the article itself.

To more fully understand the invention, reference is had to the accompanying drawings, showing the preferred embodiment of the same, in which like letters designate corresponding parts in both the views, and in which—

Figure 1:
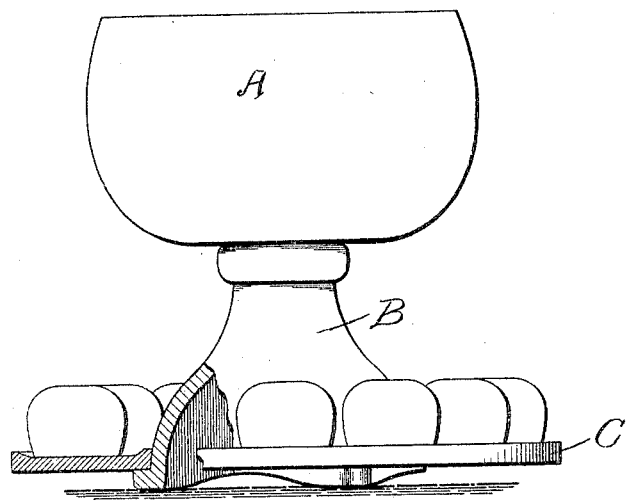
Figure 2:
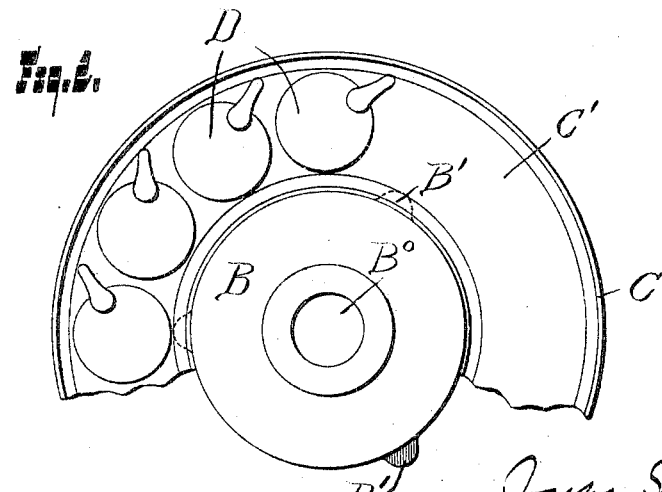

Figure 1 is a view in elevation, parts being broken away to show the preferred manner of mounting the tray on the standard or base-support; and Fig. 2 is a plan view, the bowl being removed from the standard.

In the preferred construction the article consists of three separate parts, the bowl proper, A, the standard or base B, and the annular tray C. The base-support B may be of any suitable outward contour for the sake of ornamentation, but is preferably hollow and is provided at its upper end with an aperture $B°$ for the reception of a lug (not shown) formed integral with the bottom of the bowl proper. The lower enlarged portion of the base-support B is provided with suitable projections on its exterior surface, represented by the lugs B', on which is adapted to rest the annular tray C for supporting the cups or tumblers D. This tray, as shown, preferably comprises an annular plate recessed at C', so as to catch the contents of the cups or tumblers which may be spilled, the recess also forming a more stable support for the tumblers or cups.

What I claim is—

1. A dispensing-receptacle for beverages comprising the bowl proper in combination with a detachable base-support formed with projecting means at its base, and a detachable annular tray supported on its lower face by said projecting means, substantially as described.

2. A dispensing-receptacle for beverages comprising the bowl proper in combination with a base-support, of projections formed at the bottom of said base-support, and a flanged tray detachably mounted on said projections and extending annularly around said base-support, substantially as described.

In testimony whereof I affix my signature in presence of two witnesses.

JOSEPH SIMMS.

Witnesses:
  HORACE B. MURDOCK,
  JAMES G. TUCKER.